(12) United States Patent
Hakunti et al.

(10) Patent No.: US 7,345,250 B2
(45) Date of Patent: Mar. 18, 2008

(54) KEYBOARD WITH KEY SUPPORTING STRUCTURE FOR PORTABLE ELECTRONICS DEVICES

(75) Inventors: Jussi Hakunti, Turku (FI); Mikko Laitinen, Halikko (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/571,551

(22) PCT Filed: Oct. 23, 2003

(86) PCT No.: PCT/FI03/00793

§ 371 (c)(1),
(2), (4) Date: Mar. 10, 2006

(87) PCT Pub. No.: WO2005/041232

PCT Pub. Date: May 6, 2005

(65) Prior Publication Data

US 2007/0051603 A1 Mar. 8, 2007

(51) Int. Cl.
*H01H 13/70* (2006.01)

(52) U.S. Cl. .............. 200/5 A; 200/512; 200/314; 200/341

(58) Field of Classification Search .......... 200/5 A, 200/5 R, 512–517, 520, 310, 313, 314, 317, 200/341–344; 400/472, 490–496
See application file for complete search history.

(56) References Cited

U.S. PATENT DOCUMENTS

| | | | |
|---|---|---|---|
| 5,867,772 A | 2/1999 | Jonsson et al. | |
| 5,975,711 A * | 11/1999 | Parker et al. | 200/314 |
| 6,180,895 B1 * | 1/2001 | Hutchinson et al. | 200/5 A |
| 6,462,294 B2 * | 10/2002 | Davidson et al. | 200/512 |
| 6,806,815 B1 * | 10/2004 | Kaikuranta et al. | 200/310 |

FOREIGN PATENT DOCUMENTS

| | | |
|---|---|---|
| CN | 1217129 | 5/1999 |
| EP | 1094482 | 4/2001 |
| EP | 1096841 | 5/2001 |
| EP | 1292041 | 3/2003 |
| EP | 1294161 | 3/2003 |

* cited by examiner

*Primary Examiner*—Elvin Enad
*Assistant Examiner*—M. Fishman
(74) *Attorney, Agent, or Firm*—Alfred A. Fressola; Ware, Fressola, Van Der Sluys & Adolphson LLP

(57) ABSTRACT

A keyboard assembly (20) has a light guide (23, 31, 33) and a supporting structure (23, 33) arranged to provide an illuminated and integrated keyboard assembly (20). A light guide (23, 31, 33) provides an integrated supporting, protecting and illuminating structure for keyboard assemblies (20). The keyboard assembly (20) has a layer of rigid material (31) which separates the elastic layer (21) from the printed wired board (9) located under the rigid layer (31). The layers are bonded together. The protection rib (33) is part of the combination of the elastic layer (21) and rigid layer (31) which is supported against the printed wired board (9) by the rigid layer (31). The combined structure of the light guide and supporting frame forms an integrated structure (23, 31, 33) which illuminates an array of keys (22), supports the keyboard assembly (20) and protects the keys (22) and key tops 25 from mechanical stress.

33 Claims, 3 Drawing Sheets

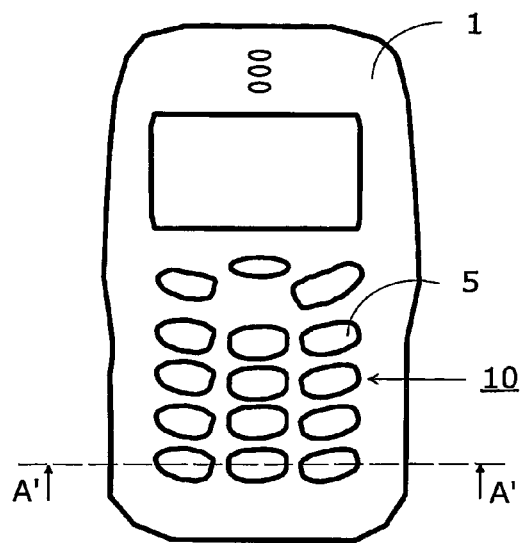
PRIOR ART  FIG 1a.
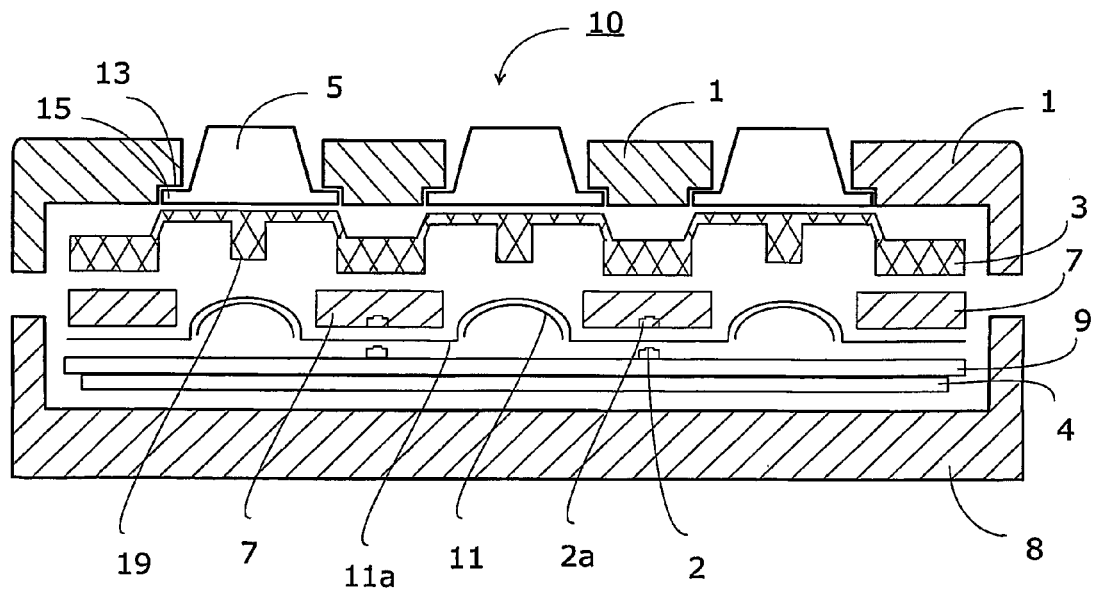
PRIOR ART  FIG 1b.

KEYBOARD WITH KEY SUPPORTING STRUCTURE FOR PORTABLE ELECTRONICS DEVICES

CROSS REFERENCE TO RELATED APPLICATIONS

This application is for entry into the U.S. national phase under §371 for International Application No. PCT/FI2003/000793 having an international filing date of Oct. 23, 2003, and from which priority is claimed under all applicable sections of Title 35 of the United States Code including, but not limited to, Sections 120, 363 and 365(c).

TECHNICAL FIELD OF THE INVENTION

This invention relates generally to a keyboard assembly of a portable electronic device, and more particularly to a keyboard assembly in which a light guide and a supporting and protecting structure are arranged to provide an illuminated and integrated keyboard assembly. This invention also relates to a light guide therefor.

BACKGROUND OF THE INVENTION

A keyboard and particularly key buttons or keys of the keyboard are typically backlit so that the user can see the keys and particularly symbols or legends on top of the keys in dark conditions, too. It is known that portable electronic devices comprising a keyboard are provided with a light guide for guiding light from a light source to the function keys, or in short the keys. The light guide which is usually formed of light-transmitting rigid material is placed between a printed wired board (PWB) and a keyboard comprising keys to transfer the light from a light source, e.g. a plurality of light emitting diodes (LED), to illuminate the keys.

The light guide has a plurality of apertures, or holes, for permitting the conductor pads on the bottom of each key or a key dome placed between the key and the underlying PWB, to contact respectively positioned contacts on the PWB by short-circuiting a pair of electrical contacts on the PWB, when pressing a key. The plurality of LEDs used to light the keys, displays and the like are mounted, e.g. surface-mounted, on the upper side of the PWB to the proximity of the keys. When the rigid light guide layer is used on top of the PWB the plurality of LEDs may also be partly embedded directly into the light-transmitting material to the proximity of the keys so that the electrical contacts on the LED are brought into contact with the corresponding conductive pads on the PWB. The plurality of LEDs may be positioned to provide desired backlighting in different patterns. The LED may be disposed directly under each key, adjacent to each key, between two adjacent keys, at the interstice between four keys or other design choice depending on the illumination brightness desired. Typically vertical-emitting or side-emitting LEDs are used as light sources. The light transmitted by a plurality of LEDs is diffused into the translucent keypad and dispersed in a manner that provides backlighting for each of the keys of the keyboard.

Referring to figure 1a there is depicted a front cover 1, a keyboard 10 and a key top 5 of a mobile phone according to prior art. The cover 1 includes openings for the keyboard assembly in the locations of key tops 5. Also referring to figure 1a there is shown a cutting line A'-A' along which a cross-section diagram is constituted depicted in figure 1b.

As shown in FIG. 1b, prior art keyboards 10 typically comprise an elastic member 3, so called silicone base, which is formed so that ridges 17 on the upper surface of the elastic member 3 define the edges of the keys. Respectively, projections 19 on the lower surface of the elastic member 3 are located under each key. The rest part of the elastic member serves as a supporting frame between the keys so that under each ridge 17 of the elastic member 3 there exists a cavity for a dome 11. The plastic dome sheet 11a is typically provided with metal domes 11 on the side not attached to the light guide 7. The dome sheet 11a is also provided with the plurality of holes (not shown) through which the light reaches the light in-coupling surfaces on the light guide. The lower surface of the elastic member 3 exluding the cavity area is supported against the rigid light guide layer 7 underneath. The keyboard 10 has a plurality of keys and key tops 5 are attached on top of the keys so that each key top 5 extends through openings provided in a front cover 1. The individual keys with key tops 5 are typically separately depressed to bring the bottom of the key into contact with electrical contacts provided on the PWB 9 under the keyboard 10. Electrical components 4 are typically disposed on one side of the PWB 9 and electrical contacts or contact pads on other side of the PWB 9.

The openings of the front cover 1 are arranged so that they support each key top 5 extending through the opening. A lower perimeter of each opening is provided with an inwardly extending indent 13 and respectively, a lower perimeter of each key top 5 is provided with an outwardly extending lip 15 so that the indent 13 and the lip 15 are engaged along each other when pressed together. The front cover 1 provides a compressive force against the elastic keyboard 10 when assembled with the PWB 9, dome sheet 11a, rigid light guide 7 and a back cover 8 ensuring electrical functionality of the portable electronic device. This means that the keyboard assembly 10 according to prior art typically provides the use of two-part cover, i.e. the front cover 1 and the back cover 8 as well as means for fixing the covers together (not shown), to be installed into the mobile phone.

In prior art the keyboard assemblies 10 are provided with a number of LEDs 2 to get the required illumination in dark conditions for the keyboards. LEDs 2 are surface-mounted on the upper side of the PWB 9 to the proximity of the keys and they may be partly embedded into cavities 2a machined to the light guide 7. In combination with the light guide 7 typically at least six to eigth LEDs 2 are needed to illuminate the keyboard assembly 10 of the mobile phone. LEDs 2 are rather large-sized components compared to other electrical components used in portable electronic devices. This means that the light guide layer 7 will be relatively thick in the keyboard assemblies 10 according to prior art. In addition, LEDs 2 are rather power consuming components which means that the larger the number of LEDS 2, the larger the power consumption. In addition, prior art keyboard assemblies 10 are arranged so that each key top 5 extends through the opening of the front cover 1, the key top 5 being the uttermost part of the device, which means that key tops 5 can be easily pulled out of the opening or damaged against mechanical stress, if any additional protection frame around the key tops 5 is not used. This situation may occur for example when user holds the mobile phone in his/her pocket unprotected. In addition, prior art keyboard assemblies provided with openings in the cover part 1 to support the whole combination of keyboard assembly 10 as described above, will limit the freedom to design keyboard assemblies independently, because the layout design of the cover part is bound up with the layout design of the keyboard.

The problems set forth above are overcome by providing a keyboard assembly for portable electronic devices having a lesser number of LEDs to achieve required illumination brightness resulting in thinner light guide structures, smaller power consumption and savings in material and production costs. In addition, protection and supporting features combined to the keyboard assembly according to the invention provide small-sized and less weighing keypad structures and consequently smaller keyboards for portable electronic devices. In addition, integrated protection features improve the mechanical robustness of the keyboard assemblies and consequently the robustness of the portable electronic devices having the keyboard assembly according to the invention. In addition, the keyboard assembly according to the invention gives more freedom to design a layout of the keyboard, as well as the portable electronic device having the keyboard assembly according to the invention.

SUMMARY OF THE INVENTION

It is an object of the invention to provide a light guide structure for keyboard assemblies having a simplified structure to illuminate the keys, to support the keyboard assembly and to protect the keys and key tops from mechanical stress. It is another object of the invention to provide a keyboard assembly comprising such a light guide structure.

The objects of the invention are achieved by providing a light guide for keyboard assemblies where a combined structure of a light guide and supporting frame forms an integrated structure to illuminate the keys, to support the keyboard assembly and to protect the keys and key tops from mechanical stress.

In accordance with a first aspect of the invention there is provided a light guide for a keyboard assembly comprising at least an elastic member forming a basis for a key and conveying a movement of the key to connecting means of the printed wired board, wherein the light guide comprises:
 a rigid member arranged to separate the elastic member from the printed wired board and arranged to separate adjacent keys from each other, and
 wherein a combination of said elastic member and said rigid member is arranged to hold together by means of the rigid member.

In a preferred embodiment a rigid member is arranged to support the combination of said elastic member and said rigid member against the printed wired board, and more particularly an outer perimeter of said rigid member is arranged to support said combination to be stationary in relation to said printed wired board when said perimeter is compressed towards said printed wired board by fastening means.

In another preferred embodiment protecting means protruding from said rigid member are arranged to protect the array of keys and key tops from mechanical stress. Preferably, said protecting means extend at least to the same level as the outer top surface of the keys or key tops of the keyboard according to the invention.

In still another preferred embodiment a rigid member is made of light-conducting material to guide the light from a light source to illuminate the array of keys and key tops. Preferably, a light source is disposed adjacent to an end of said protecting means.

In accordance with a second aspect of the invention there is provided a keyboard assembly comprising at least a printed wired board and an array of keys, the keyboard assembly having:
 an elastic member arranged to form a basis for a key, and to convey a movement of the key to connecting means of the printed wired board,
 a rigid member, having an opening at the location of the key, arranged to separate the elastic member from the printed wired board and arranged to separate adjacent keys from each other, and
 wherein a combination of said elastic member and said rigid member is arranged to hold together by means of the rigid member.

In a preferred embodiment a rigid member is arranged to support the combination of said elastic member and said rigid member against the printed wired board, and more particularly an outer perimeter of said rigid member is arranged to support said combination to be stationary in relation to said printed wired board when said perimeter is compressed towards said printed wired board by fastening means.

In another preferred embodiment protecting means protruding from said rigid member are arranged to protect the array of keys and key tops from mechanical stress. Preferably, said protecting means extend at least to the same level as the outer top surface of the keys or key tops of the keyboard according to the invention.

In still another preferred embodiment a rigid member is made of light-conducting material to guide the light from a light source to illuminate the array of keys and key tops. Preferably, a light source is disposed adjacent to an end of said protecting means.

A benefit of the embodied invention provides a solution in which a light guide, supporting frame and protection frame of the keyboard assembly is integrated into a single one-piece element. This improves the mechanical robustness of the keyboard assemblies and gives more freedom to design a layout of the keyboard. Another benefit of the embodied invention is that it provides a solution in which less number of light sources disposed adjacent to the rigid layer forms a basis for a thin light guide structures in the keyboard assemblies for portable electronic devices which is advantageous in light of an increasing demand for miniaturization and lightness of portable devices, e.g. mobil communication devices. This also contributes to smaller power consumption and savings in material and production costs.

BRIEF DESCRIPTION OF THE DRAWINGS

An embodiment of the invention will be described in detail below, by way of example only, with reference to the accompanying drawings, of which FIG. 1a depicts a front view of a communication device comprising a keyboard assembly according to prior art, FIG. 1b depicts a cross-section diagram of the keyboard assembly according to prior art of FIG. 1a along the cutting line A'-A'.

DETAILED DESCRIPTION OF THE INVENTION

A description of FIGS. 1a and 1b was given earlier in connection with the description of the state of the art.

Figure 2:
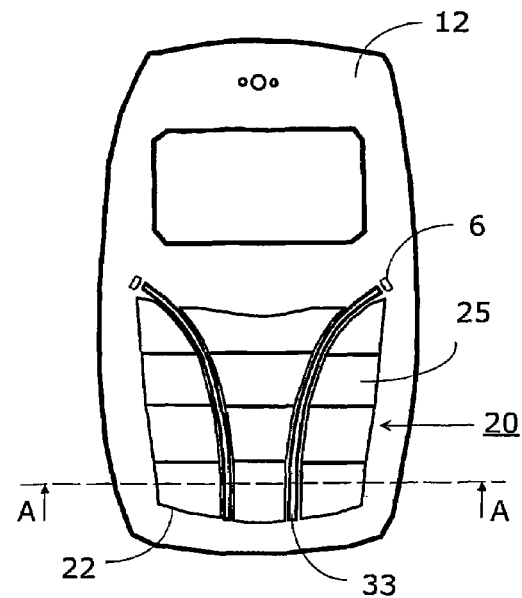
FIG. 2 depicts a front view of a communication device according to an embodiment of the invention.

Referring to FIG. 2 there is shown an embodiment of a communication device according to the invention comprising a cover 12, keyboard assembly 20 with a plurality of keys, key tops 25, protection ribs 33 and an exemplary location of a light source 6 under the cover in dashed line. All these components mentioned above are discussed more detail later in this description. Still referring to FIG. 2 there is shown a dashed line A-A to depict an exemplary cutting line along which is constituted an exemplary cross-section diagram of the keyboard assembly 20 according an embodiment of the invention in FIGS. 3 and 4.

Figure 3:
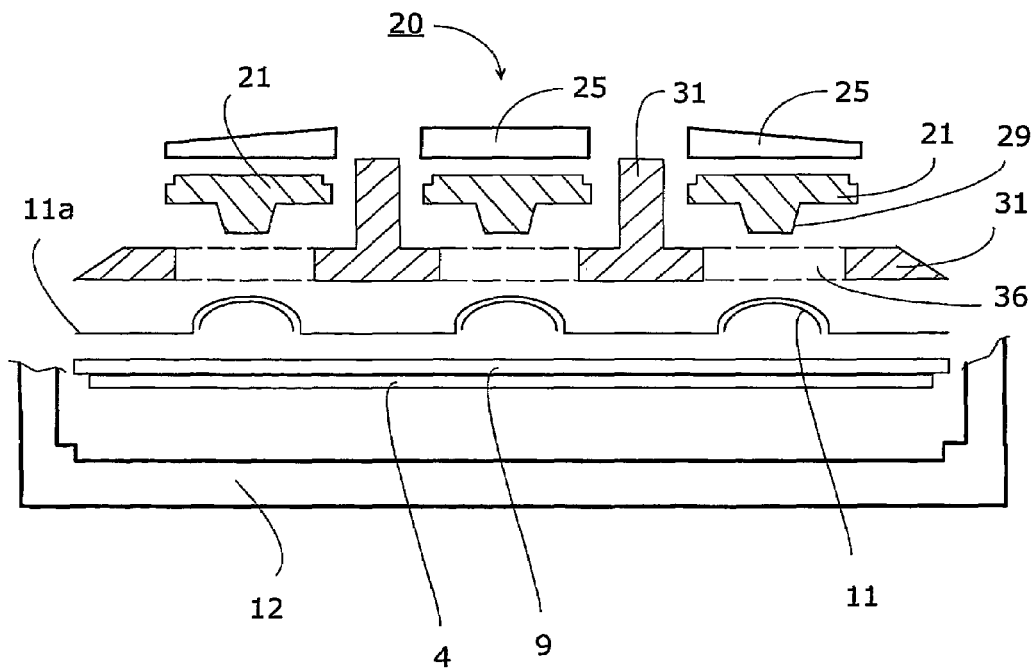
FIG. 3 depicts an exploded view of a cross-section diagram of the keyboard assembly of FIG. 2 along the cutting line A-A in accordance with an embodiment of the invention.

FIG. 3 shows an exploded view of a keyboard assembly 20 which is provided with a layer of elastic material 21, preferably in a sheet-like form, which forms a basis for an array of keys and for individual keys therein. The elastic material layer 21, preferably a silicone compound layer, forms a silicone skirt 21 for each key location in the array of keys. An upper surface of the silicone skirt 21 is preferably planar and a lower surface of the silicon skirt 21 has a planar perimeter fringe and projections 29 in the middle. A key top 25 for each key is attached on top of the upper surface of the silicone skirt 21 on each key location. Preferably a key top 25, preferably a hard plastic key top, is adhered on top of the silicone skirt 21 with elastic glue between the key top 25 and silicone skirt 21.

FIG. 3 also depicts a layer of rigid material 31, preferably in a homogeneous one-piece sheet-like form, which layer includes an opening at each key location in the array of keys. The rigid material layer 31, preferably a polycarbonate layer, separates the elastic layer 21 from a printed wired board 9 which is under the rigid layer. A lower surface of the elastic layer 21 is bonded with an upper surface of the rigid layer 31 exluding a region of each opening of the rigid layer at each key location. The bonded area is defined so that when the elastic layer 21 is set on top of the rigid layer 31 all the surfaces of said layers that face directly each other are bonded together. The lower surface of the elastic layer 21 and the upper surface of the rigid layer 31 are bonded together, preferably adhered to each other by a physical or chemical adhesion, e.g. by using a co-moulding process.

The elastic layer, preferably a silicone skirt 21, which forms a basis for a key, includes projections 29 on the lower surface at each key location to convey a movement of the key to the contact pads locating on an upper surface of the printed wired board 9. At each key location there is arranged a cavity under the silicon skirt 21 which cavity is constituted by the openings of the rigid layer 31 at each key location. In connection with each cavity there is arranged a key dome 11 made of conductive material which in co-operation with the projection 29 conveys the movement of the key to the printed wired board 9 by permitting the key dome 11 to contact respectively positioned contacts on the printed wired board 9 in the known way, when pressing the key. As known, an array of key domes 11 is preferably arranged in form of a dome sheet 11a constituting an insulating foil, preferably plastic foil, in which a metallic key dome is disposed at each key location so that the metal dome is attached to the insulating foil facing to the printed wired board but not contacting the contact pads on the printed wired board 9 if the key is not pressed. In the keyboard assembly according to the invention the dome sheet 11a is mounted between the lower surface of the rigid layer 31 and the upper side of the printed wired board 9 so that each metal dome 11 is located in the cavity defined by the openings 36 of the rigid layer 31. Preferably, the plastic dome sheet 11a is glued onto the lower surface of the rigid layer 31 with an adhesive.

According to an embodiment of the invention the elastic layer 21 is in a form of a one-piece sheet which size is fitted within the area of the array of keys. The area of the array of keys (and key tops) is shown in FIG. 2 with the reference line 22 which circles around a plurality of key tops 25 and interspaces between key tops 25. Preferably, the surface area of the elastic member 21 is the same as the area circled around by the reference line 22 shown in FIG. 2. i.e. the outer perimeter 27 of the elastic layer 21 follows the outer edge of the array of key tops 25. According to one embodiment of the invention the elastic layer 21 includes an opening or slit between two adjacent key locations, preferably between two adjacent rows of key locations in the array of keys 22. An exemplary location for said opening or slit is shown in FIG. 2 by reference 33.

According to another embodiment of the invention the elastic layer 21 is in a form of a homogeneous multi-piece sheet where a size of each piece of sheet or strip is fitted within the area of a row of key tops 25 in the array of keys 22. This means that under each row of key tops 25 there is arranged a separate elastic layer 21 strip. According to one embodiment of the invention the surface area of each elastic layer 21 is defined by the area circled around each row of key tops 25. Preferably the outer perimeter 27 of each elastic layer 21 follows the edge of each row of key tops 25 in the array of the key tops 25.

The rigid layer 31, preferably in a form of homogeneous one-piece sheet, which size is larger that a size of the elastic layer 21 so that when the elastic layer 21 is set on top of the rigid layer 31 an outer perimeter 23 of said rigid layer 31 extends further than an outer perimeter 27 of said elastic layer 21. i.e. the outer perimeter 23 of the rigid layer 31 exceeds the outer perimeter of the area of the array of keys 22 (and key tops) as shown in FIG. 2 with the reference line 22 which circles around a plurality of key tops 25 and interspaces between key tops 25.

Figure 4:
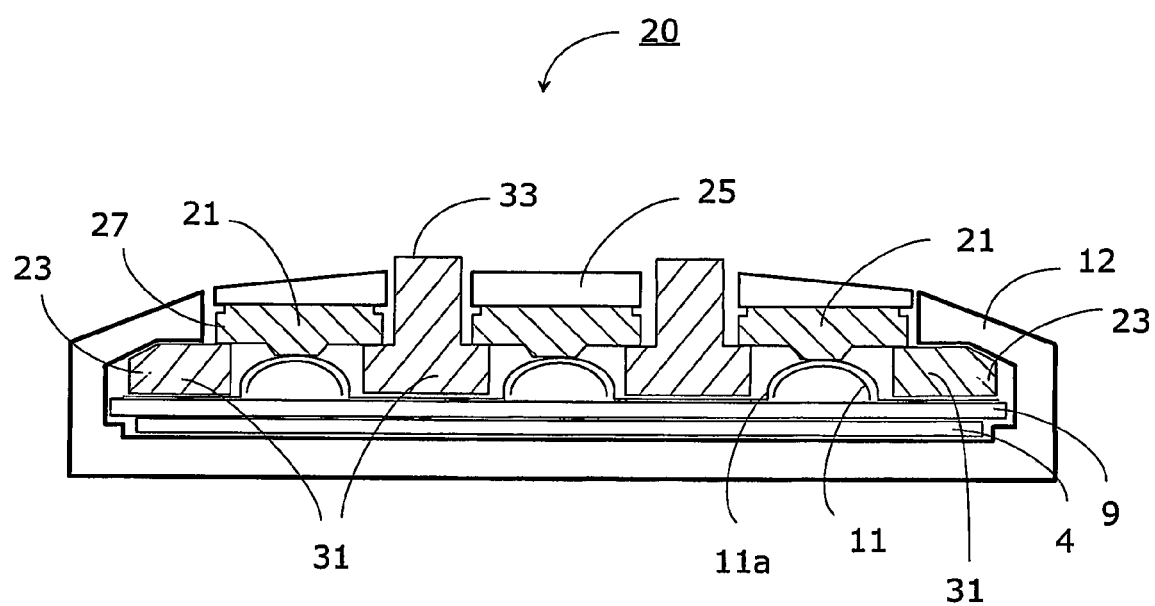
FIG. 4 depicts a cross-section diagram of the keyboard assembly of FIG. 2 along the cutting line A-A in accordance with an embodiment of the invention.

FIG. 4 shows, as described above, that the lower surface of the elastic layer 21 and the upper surface of the rigid layer 31 are bonded together, preferably adhered to each other by a physical or chemical adhesion. The one-piece rigid layer 31 including openings 36 for keys and key domes 11 is referenced next with numbers 31, 23 and 33 to be explained more detail. The combination of the elastic layer 21 and the rigid layer 31 is supported by said rigid layer 31, so that the outer perimeter region 23 of said first surface of said rigid layer 31 supports said combination to be stationary in relation to the underlying printed wired board 9, when said perimeter region 23 is compressed towards the printed wired board 9 by fastening means 12, 23. According to one preferred embodiment of the invention said combination is supported to be stationary in relation to the underlying printed wired board 9, when said region 23 is compressed towards the printed wired board 9 by means of compressing the upper surface of the perimeter 23 of the rigid layer 31 and the edge of the cover 12 towards each other. To employ this, as an example, the cover 12 of the electronic device is designed to the form that the inner surface of the cover 12 follows the shape of the printed wired board 9, the component area 4 under the printed wired board 9 and the perimeter region 23 of the rigid layer 31. Resulting from the fastening mechanism described above there is required only one cover part 12 to construct the portable electronic device comprising the keyboard assembly 20. While in prior art solutions there is required the front cover 1 and back cover 8 to fasten the keyboard assembly 10 into the mobile phone as shown in FIGS. 1a and 1b.

According to one embodiment of the invention at least part of the rigid layer 31 protrudes along at least one row of keys or keytops 25, preferably between two adjacent rows of key tops 25, to protect said keys or said rows of key tops 25 against mechanical stress between adjacent keys and against external mechanical stress. This protruding part 33 of the rigid layer 31, preferably a protection rib 33, forms a homogeneous part of the rigid member 31 and is made of same material as the rigid layer 31. Hence, the protection rib 33 includes to the same supporting and protecting frame structure of the keyboard assembly 20 as the rigid layer 31. The protection rib 33 is part of the combination of the elastic layer 21 and rigid layer 31 which is supported against the printed wired board 9 by the rigid layer 31. The outer edge of said protecting means 33, preferably the protection rib, protrudes at least to the same level as the outer surface of the key or key top 25 of said row of keys or key tops 25. The protection ribs 33 according to the invention can also been used as a design feature in the keyboard assembly.

As described earlier, the elastic layer 21, which is in a form of a one-piece sheet, includes an aperture or slit between two adjacent key locations, preferably between two adjacent rows of key locations in the array of key tops 25. An exemplary location for said opening or slit is shown in FIG. 2 by reference 33. According one embodiment of the invention the elastic layer 21 is set on top of the rigid layer 23 so that the openings or slits of the elastic layer 21 match to protecting means 33 and after this the lower surface of the elastic layer 21 and the upper surface of the rigid layer 31 are bonded together, preferably adhered to each other as described earlier. The use of the protecting means 33 will help support the combination of the elastic layer 21 and rigid layer 31 against the printed wired board 9 by the rigid layer 31, because by means of the protection rib 33 it is easy to position the elastic layer 21 provided with the apertures stationary on its place, i.e. to face said surfaces in a position where the protection rib 33 fits to the aperture of the elastic layer 21. In a manner described earlier said combination is supported to be stationary in relation to the underlying printed wired board 9, when the rigid layer 31 is compressed towards the printed wired board 9 by means of compressing the upper surface of the perimeter 23 of the rigid layer 31 towards the edge of the cover 12. The purpose of said protecting means 33, preferably the protection rib, is to support adjacent key tops 25 to be separated from each other so that the keys in each key location of the array of keys 22 function properly capable of conveying a movement of the key via the key dome 11 to the contact pads on the printed wired board 9.

According to still another embodiment of the invention a layer of rigid material 31, preferably in a one-piece sheet-like form, which layer includes an opening 36 at each key location in the array of keys 22, the rigid material layer 31 is of homogeneous light-conducting material, preferably a polycarbonate layer, which is capable of transmitting light and capable of guiding the light from a light source 6, preferably a light emitting diode or LED, to the array of keys 22 to illuminate the keys and key tops 25. The rigid layer 31, preferably a polycarbonate layer, is a light guide which has a high luminocity. The rigid layer 31 including the protection rib 33 is a platform to effectively illuminate the whole area of the array of key tops 25 or the key tops 25 individually. The light source 6 is locating near the edge of the rigid material where the light is directed towards the edge of the rigid layer 23, 31, 33 horizontally, i.e. to the direction parallel with the upper and lower surface of the rigid layer 23, 31, 33. According to a preferred embodiment of the invention the light source 6 is arranged to transmit light into the rigid layer 23, 31, 33 from the location which is adjacent to the end of the protecting means 33, preferably the protection rib. For example, if two protection ribs 33 are used in the keyboard assembly 20 one LED 6 may dispose at one end of both protection rib 33. The use of protection ribs 33 as part of the light guide 23, 31, 33 is an effective way to illuminate the key tops 25 because the light comes from sideward direction to the key tops 25 adjacent the protection rib 33. In case the protection rib 33 protrudes to the higher level than the level of the outer surface of the key or key top 25 of said row of keys or key tops 25 the light comes from sideward direction and also diagonally upward direction to the key tops 25 adjacent the protection rib 33 which makes the illumination more effective. The arrangement of light sources 6 described above reduces a number of required LEDs in the keyboard assembly according to the invention.

A light source disposed adjacent to the rigid layer 23, 31, 33 which forms a light guide, but not inside the rigid layer 23, 31, 33 enables to use thin light guide structures in the keyboard assemblies for portable electronic devices. The construction of a thinner keyboard assembly 20 is advantageous in light of an increasing demand for miniaturization and lightness of portable devices, e.g. mobil communication devices.

While this invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

The invention claimed is:

1. A light guide for a keyboard assembly comprising:
   at least one elastic member forming a basis for a key and conveying a movement of the key to connecting means of a printed wired board,
   a rigid member arranged to separate the elastic member from the printed wired board and arranged to separate adjacent keys from each other, and
   wherein said elastic member is held in place by the rigid member and an edge of the rigid member is arranged to protrude at least to the same level as a key top of the key.

2. The light guide according to claim 1, wherein an outer perimeter of said rigid member is arranged to extend further than an outer perimeter of said elastic member.

3. The light guide according to claim 1, wherein a first surface of said elastic member is arranged to be a key top surface, and a second surface of said elastic member is arranged to bond with a first surface of said rigid member excluding the area of said surfaces defined by openings of said rigid member.

4. The light guide according to claim 3, wherein a second surface of said rigid member is arranged to support said combination of said elastic member and said rigid member against the printed wired board.

5. The light guide according to claim 4, wherein said rigid member is arranged to support said combination of said elastic member and said rigid member, and said outer perimeter region of said first surface of said rigid member is arranged to support said combination to be stationary in relation to said printed wired board, when said perimeter region is compressed towards said printed wired board by fastening means.

6. The light guide according to claim 1, wherein the rigid member is arranged to separate adjacent key tops from each other, where said key tops are adhered to on top of the first surface of the elastic member at the location of the keys.

7. The light guide according to claim 1, wherein at least part of said rigid member is arranged to protrude along at least one row of key tops to form protecting means for said key tops of said row of keys.

8. The light guide according to claim 1, wherein said rigid member is arranged to protrude between at least two adjacent rows of key tops to form protecting means for said key tops of said row of keys.

9. The light guide according to claim 8, wherein an outer edge of said protecting means is arranged to protrude at least to the same level as the outer top surfaces of the key tops of said row of keys.

10. The light guide according to claim 9, wherein said elastic member is arranged to have an aperture at the location of said protecting means, and said second surface of said elastic member and said first surface of said rigid member are arranged to face in a position where said protecting means fit to said aperture before bonding said surfaces together.

11. The light guide according to claim 1, wherein said rigid member is made of light-conducting material and a light source is arranged to transmit light into said rigid member to illuminate the array of keys or key tops.

12. The light guide according to claim 1, wherein a light source arranged to transmit light into said rigid member is located adjacent to an edge of said rigid member.

13. The light guide according to claim 8, wherein a light source arranged to transmit light into said rigid member is located adjacent to an end of said protecting means.

14. The light guide according to claim 13, wherein one light emitting diode arranged to transmit light into said rigid member is located adjacent to one end of said protecting means.

15. The light guide according to claim 1, wherein said light guide comprises fastening means to be attached to a cover part of a portable electronic device.

16. The light guide according to claim 1, wherein said rigid member and said elastic member are arranged to be in a sheet like form.

17. A keyboard assembly, comprising:
at least a printed wired board and an array of keys, the keyboard assembly having:
an elastic member arranged to form a basis for at least one key, and to convey a movement of the key to connecting means of the printed wired board,
a rigid member, having an opening at the location of the key, arranged to separate the elastic member from the printed wired board and arranged to separate adjacent keys from each other, and
wherein said elastic member is held in place by the rigid member and an edge of said rigid member is arranged to protrude at least to the same level as a key top of the key.

18. The keyboard assembly according to claim 17, wherein an outer perimeter of said rigid member is arranged to extend further than an outer perimeter of said elastic member.

19. The keyboard assembly according to claim 17, wherein a first surface of said elastic member is arranged to be a key top surface, and a second surface of said elastic member is arranged to bond with a first surface of said rigid member excluding the area of said surfaces defined by said openings of said rigid member.

20. The keyboard assembly according to claim 19, wherein a second surface of said rigid member is arranged to support said elastic member and said rigid member against the printed wired board.

21. The keyboard assembly according to claim 20, wherein said rigid member is arranged to support said elastic member and said rigid member, and said outer perimeter region of said first surface of said rigid member is arranged to support said elastic member and said rigid member to be stationary in relation to said printed wired board, when said perimeter region is compressed towards said printed wired board by fastening means.

22. The keyboard assembly according to claim 17, wherein a key top, is arranged to adhere on top of said first surface of said elastic member at the location of the key.

23. The keyboard assembly according to claim 17, wherein at least part of said rigid member is arranged to protrude along at least one row of keys to form protecting means for said keys of said row of keys.

24. The keyboard assembly according to claim 17, wherein said rigid member is arranged to protrude between at least two adjacent rows of keys to form protecting means for said keys of said rows of keys.

25. The keyboard assembly according to claim 24, wherein an outer edge of said protecting means is arranged to protrude at least to the same level as the outer top surface of the key or the key top of said row of keys.

26. The keyboard assembly according to claim 25, wherein said elastic member is arranged to have an aperture at the location of said protecting means, and said second surface of said elastic member and said first surface of said rigid member are arranged to face in a position where said protecting means fit to said aperture before bonding said surfaces together.

27. The keyboard assembly according to claim 17, wherein said rigid member is made of light-conducting material and a light source is arranged to transmit light into said rigid member to illuminate the array of keys or the array of key tops.

28. The keyboard assembly according to claim 17, wherein a light source arranged to transmit light into said rigid member is located adjacent to an edge of said rigid member.

29. The keyboard assembly according to claim 23, wherein a light source arranged to transmit light into said rigid member is located adjacent to an end of said protecting means.

30. The keyboard assembly according to claim 29, wherein one light emitting diode arranged to transmit light into said rigid member is located adjacent to one end of said protecting means.

31. The keyboard assembly according to claim 21, wherein said fastening means comprise a cover part of the portable electronic device.

32. The keyboard assembly according to claim 17, wherein said rigid member and said elastic member are arranged to be in a sheet like form.

33. A keyboard assembly, comprising:
at least a printed wired board and an array of keys, the keyboard assembly having:
means for providing an elastic basis for at least one key, and to convey a movement of the key to connecting means of the printed wired board,
means for rigidly separating the means for providing an elastic basis from the printed wired board and arranged to separate adjacent keys from each other and for providing an opening at the location of the key, and
wherein said means for providing an elastic basis is held in place by the means for rigidly separating, and an edge of said means for rigidly separating is arranged to protrude at least to the same level as a key top of the key.

* * * * *